United States Patent [19]
Yourgalite et al.

[11] Patent Number: 5,445,493
[45] Date of Patent: Aug. 29, 1995

[54] APPARATUS FOR PALLETIZING/UNITIZING EASILY COMPRESSIBLE PRODUCTS

[75] Inventors: Ray A. Yourgalite, Hoopeston; Kenneth F. Becicka, Alvin, both of Ill.; Jay A. Dark, West Lafayette, Ind.; Alan R. Reece; Robert J. Kleber, both of Hoopeston, Ill.

[73] Assignee: Simplimatic Engineering Company, Lynchburg, Va.

[21] Appl. No.: 52,345

[22] Filed: Apr. 22, 1993

[51] Int. Cl.6 .............................................. B65G 57/24
[52] U.S. Cl. ................... 414/791.6; 198/374; 414/792.9
[58] Field of Search ............... 198/374; 414/791.6, 414/792.9, 907

[56] References Cited
U.S. PATENT DOCUMENTS

| | | | |
|---|---|---|---|
| 3,294,257 | 12/1966 | Davies et al. | 198/374 X |
| 3,523,601 | 8/1970 | Roth et al. | 198/374 |
| 4,669,604 | 6/1987 | Lenhart | 198/433 X |
| 4,995,224 | 2/1991 | Yourgalite et al. | 53/540 |
| 5,005,335 | 4/1991 | Yourgalite et al. | 53/399 |
| 5,046,303 | 9/1991 | Becicka et al. | 53/540 |
| 5,139,388 | 8/1992 | Martin | 414/791.6 X |

Primary Examiner—Michael S. Huppert
Assistant Examiner—Janice L. Krizek
Attorney, Agent, or Firm—St. Onge Steward Johnson & Reens

[57] ABSTRACT

An apparatus for palletizing/unitizing easily compressible articles comprises a station conveyor having a diverter for selectively positioning the articles longitudinally along a path defined by the rollers of the station conveyor, a turner for selectively orienting the articles transverse to the path, a layer accumulation stop for blocking the travel of individual articles while the articles are combined into a single layer, a flusher for tightening up the articles in a layer, a hand assembly for picking up entire layers of articles while subsequent layers are positioned below the hand assembly and for transporting multiple layers to the turntable of a palletizer, a platen assembly for maintaining the integrity of the stacked articles while they are on the turntable, and a lift for raising the stack during wrapping so that the articles can be underwrapped.

28 Claims, 13 Drawing Sheets

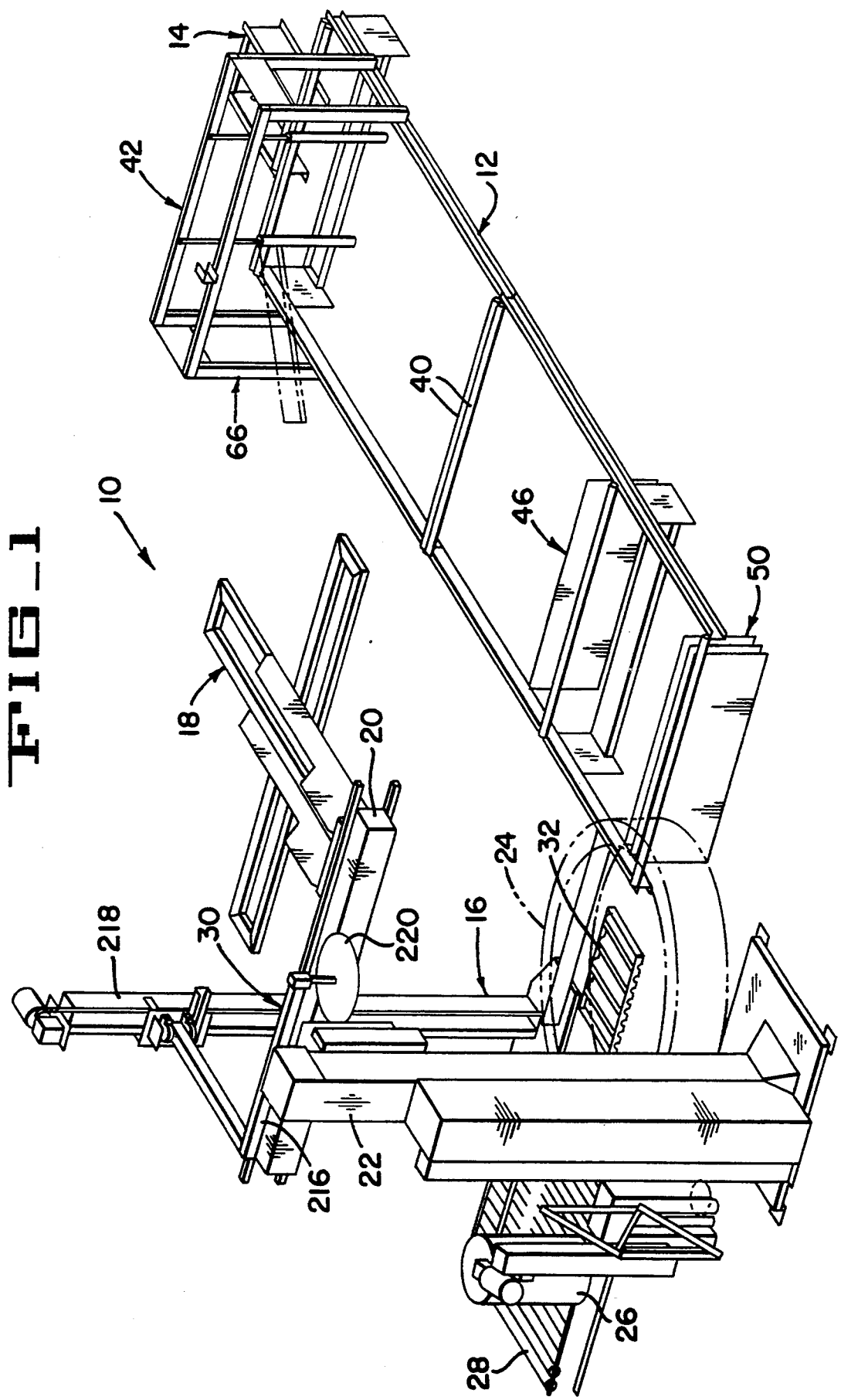
FIG_1

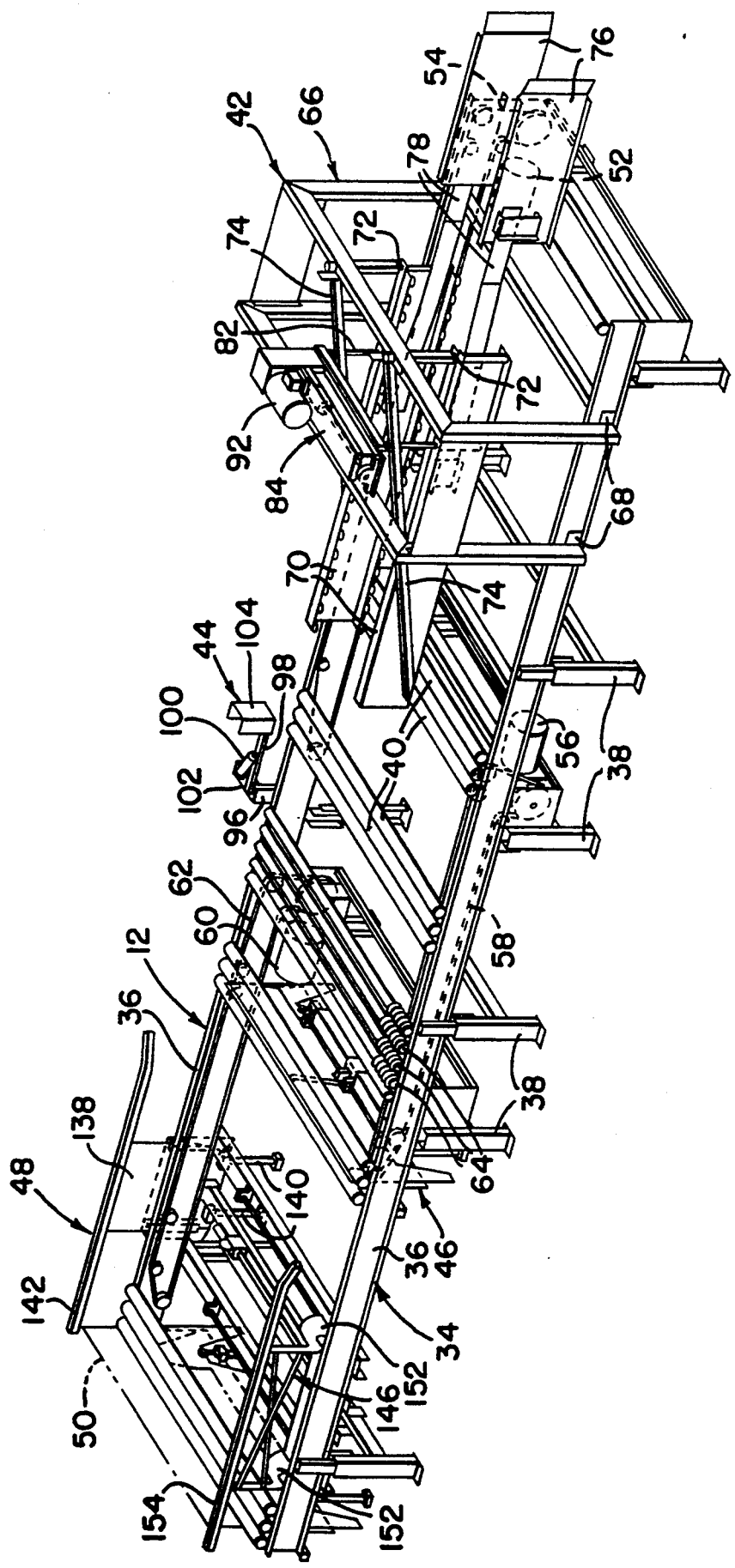

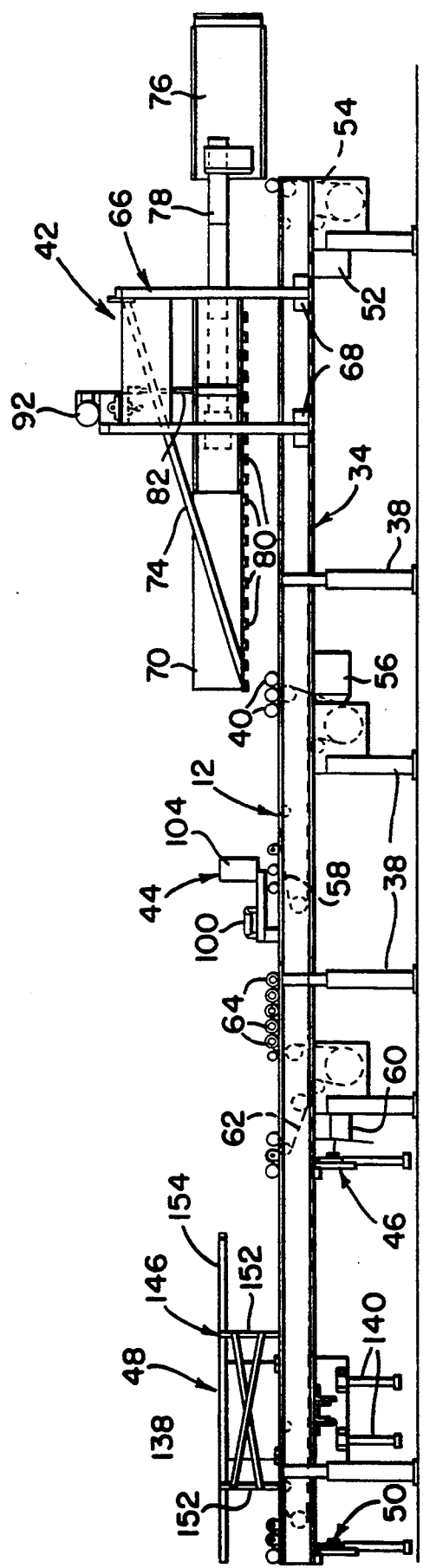

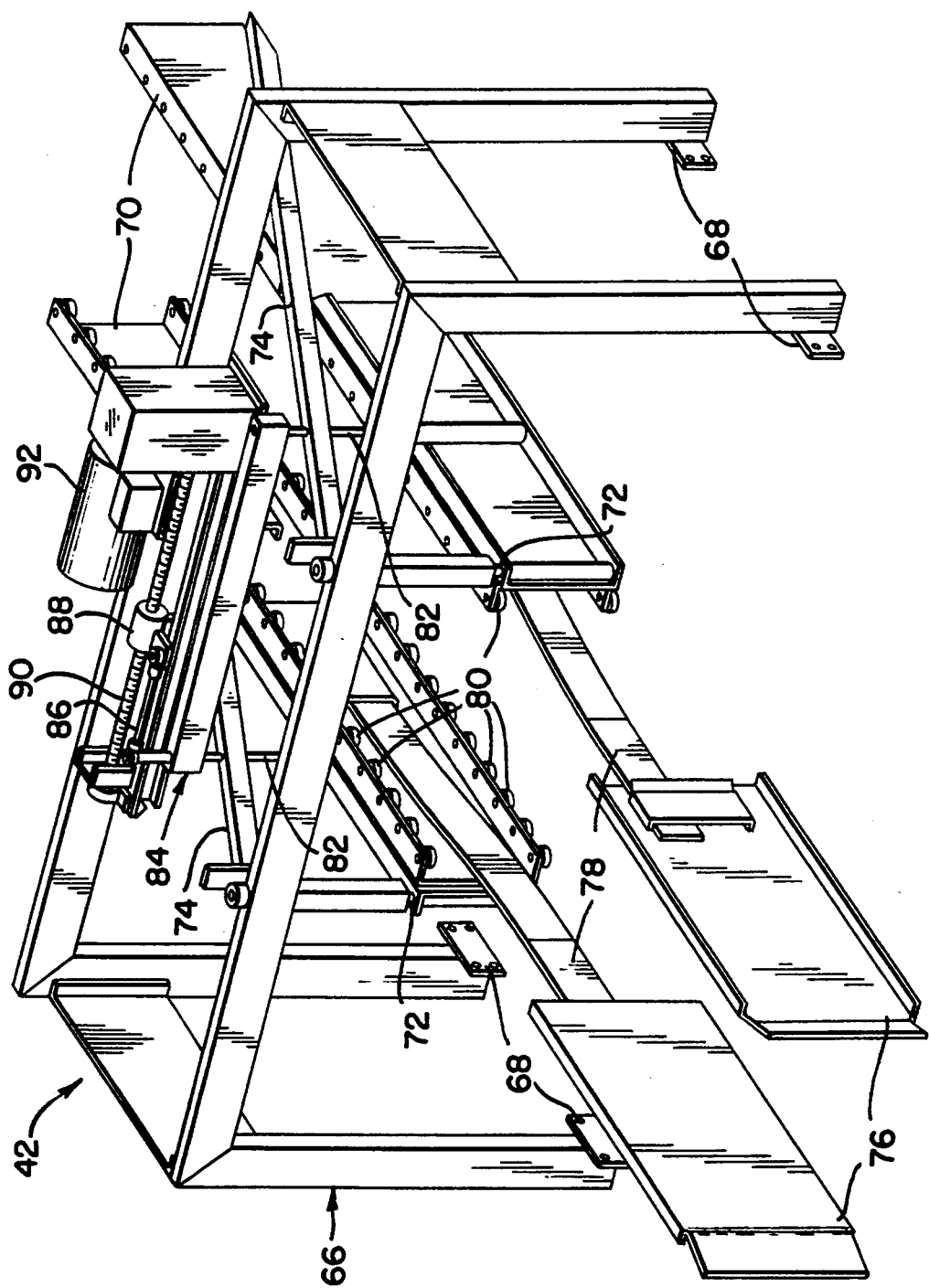

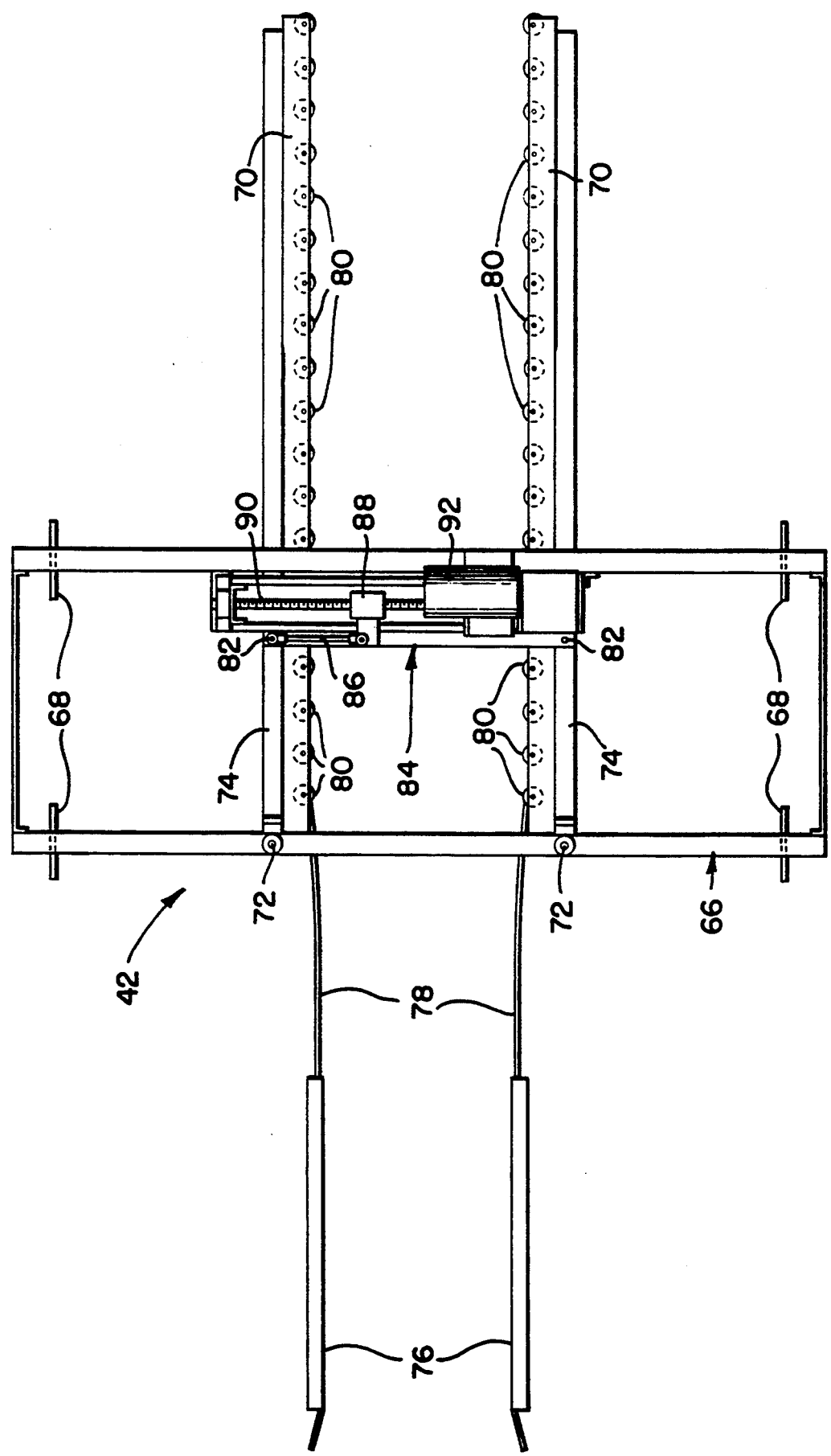

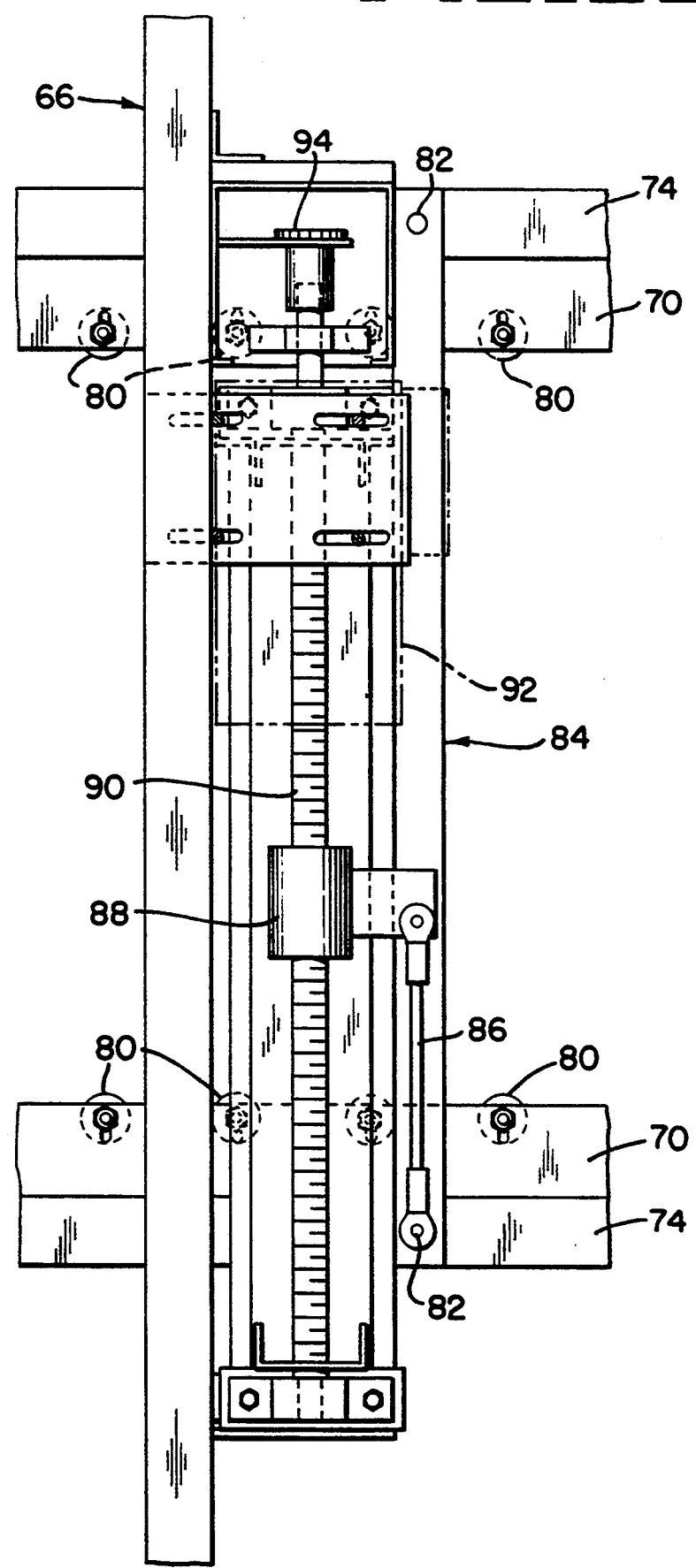

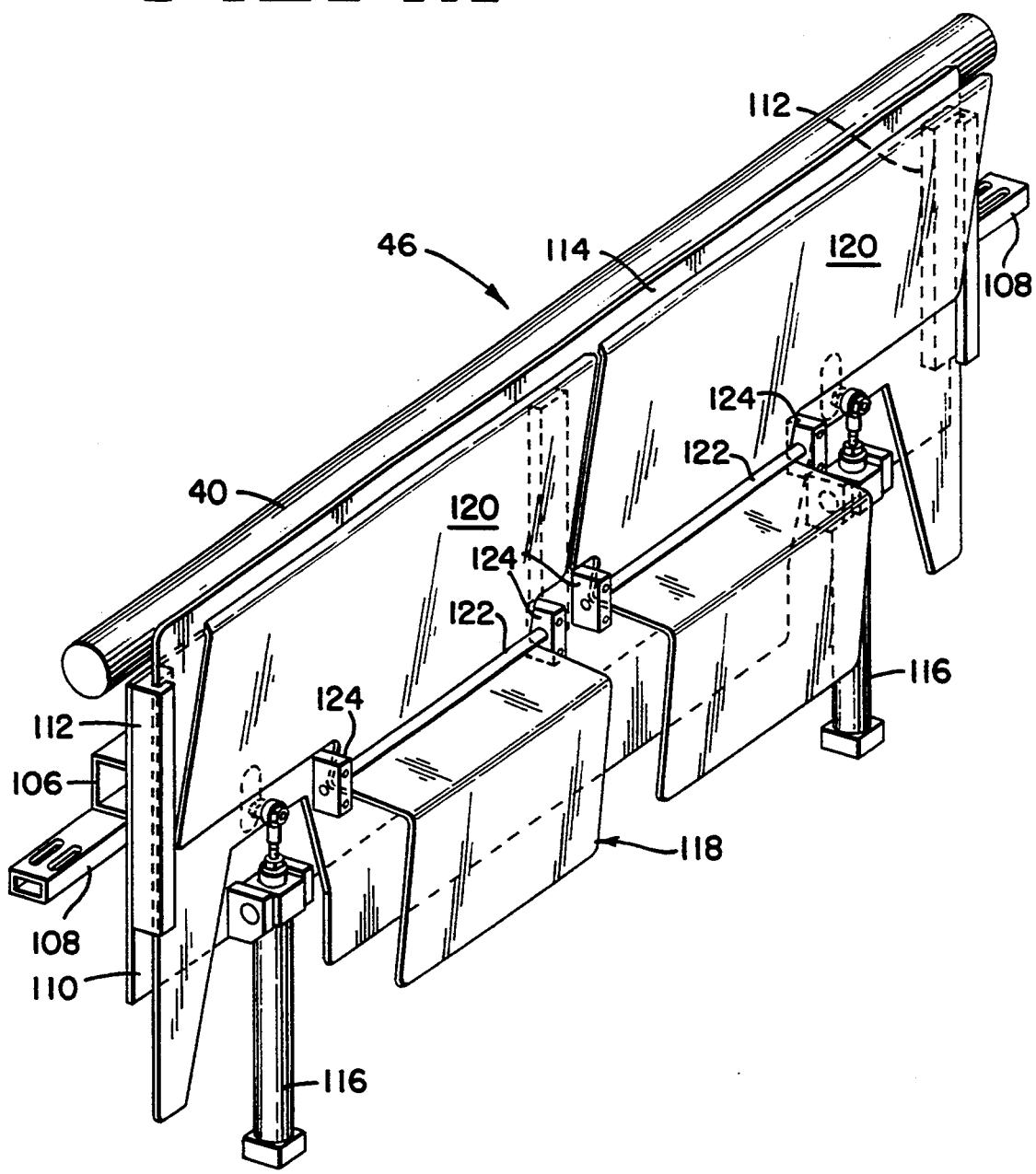
FIG_4A

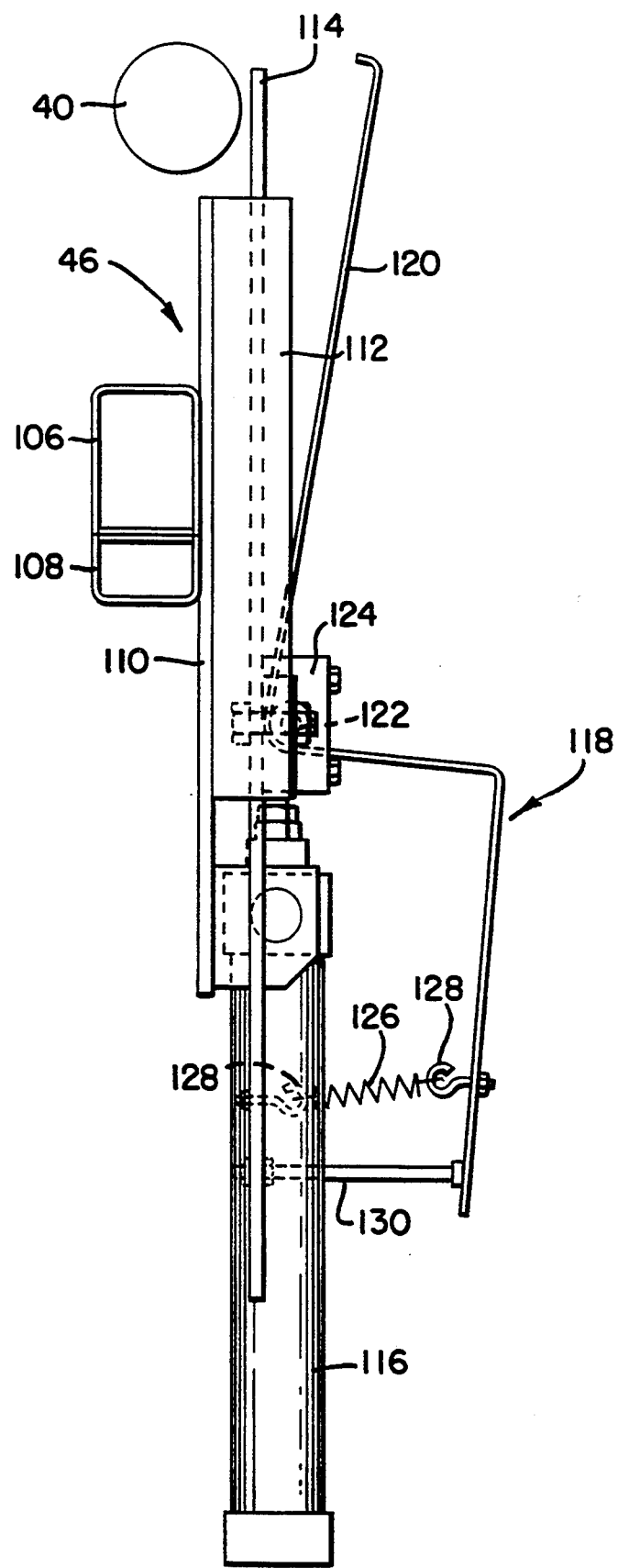

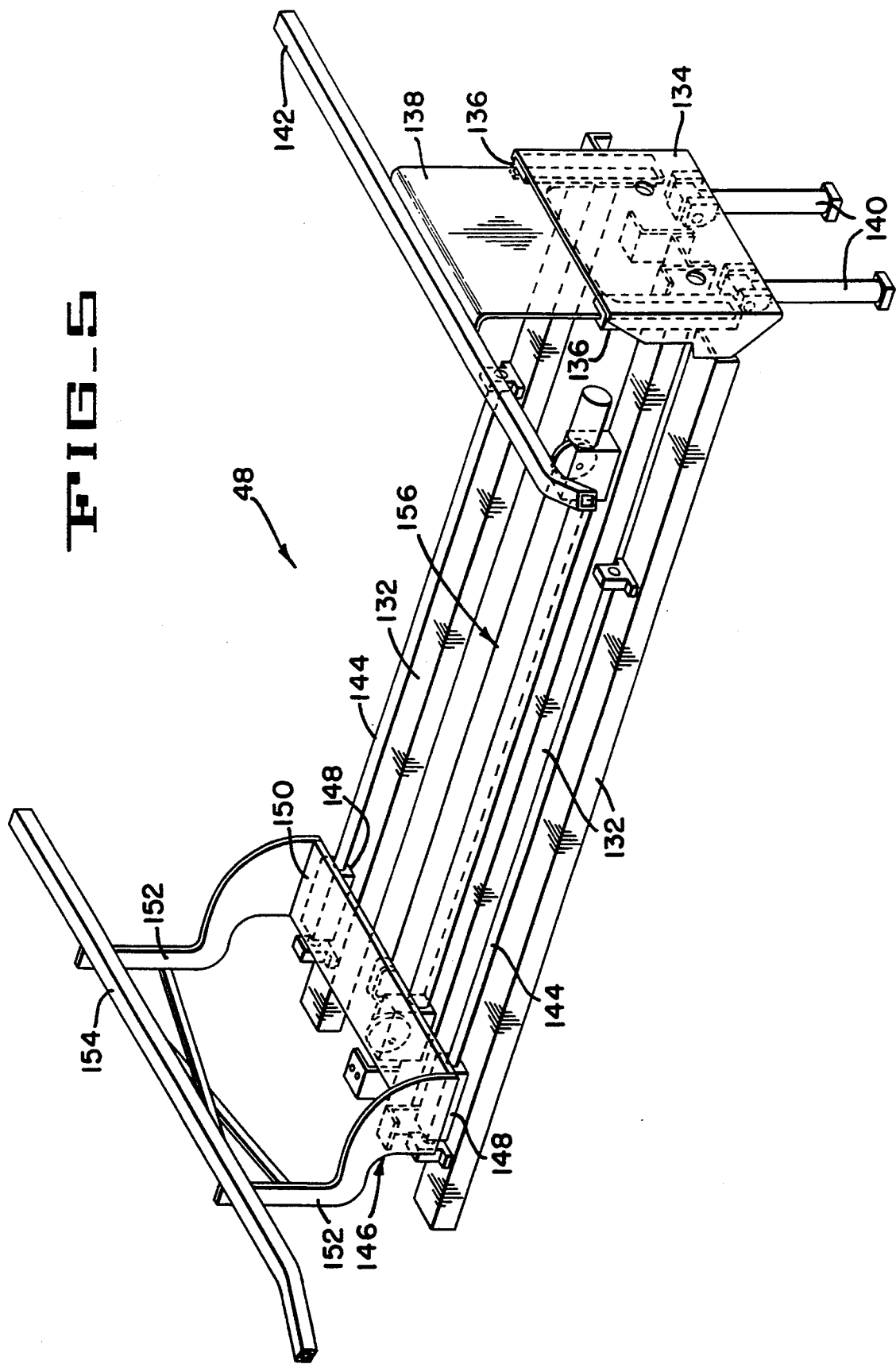

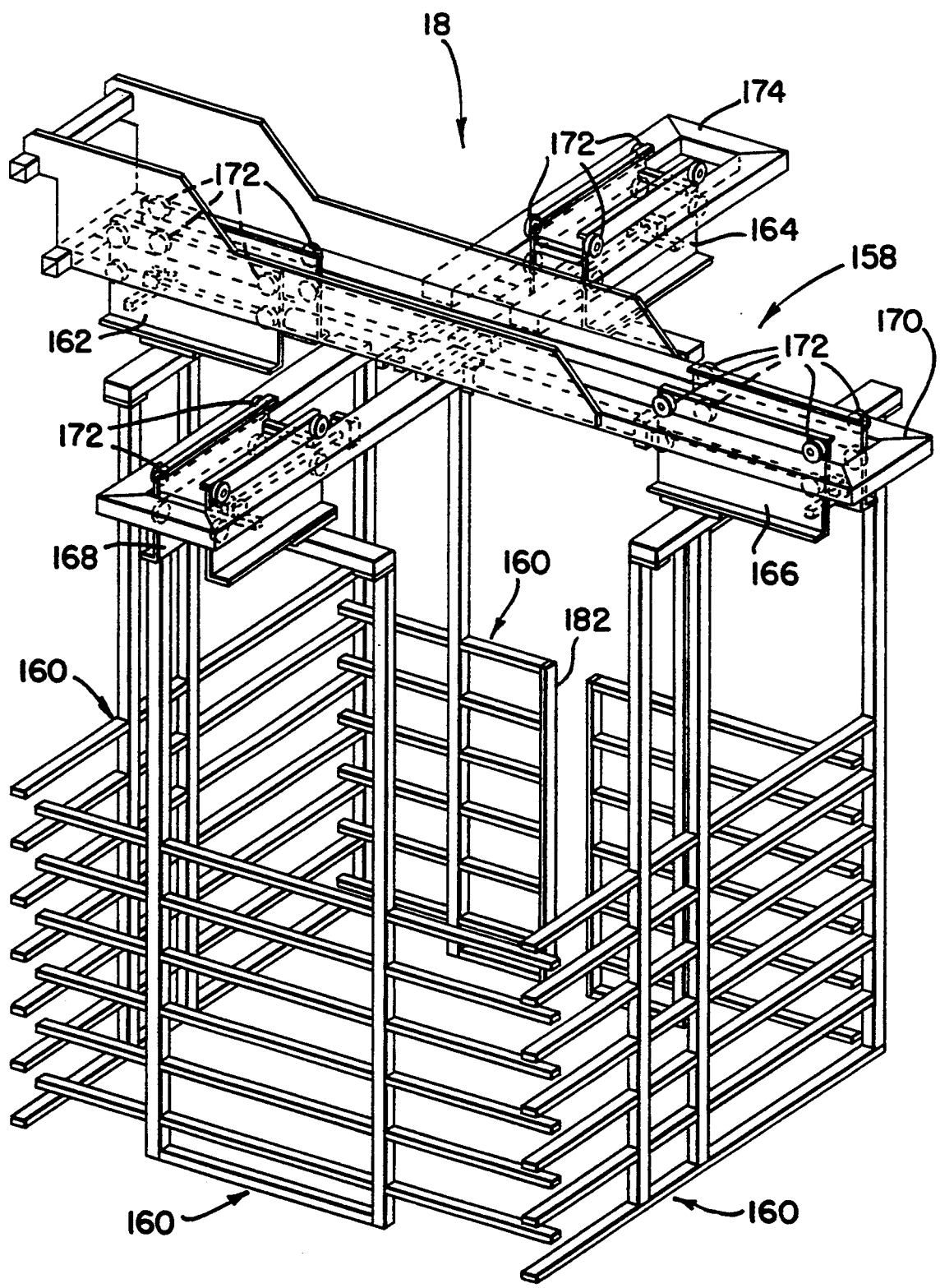

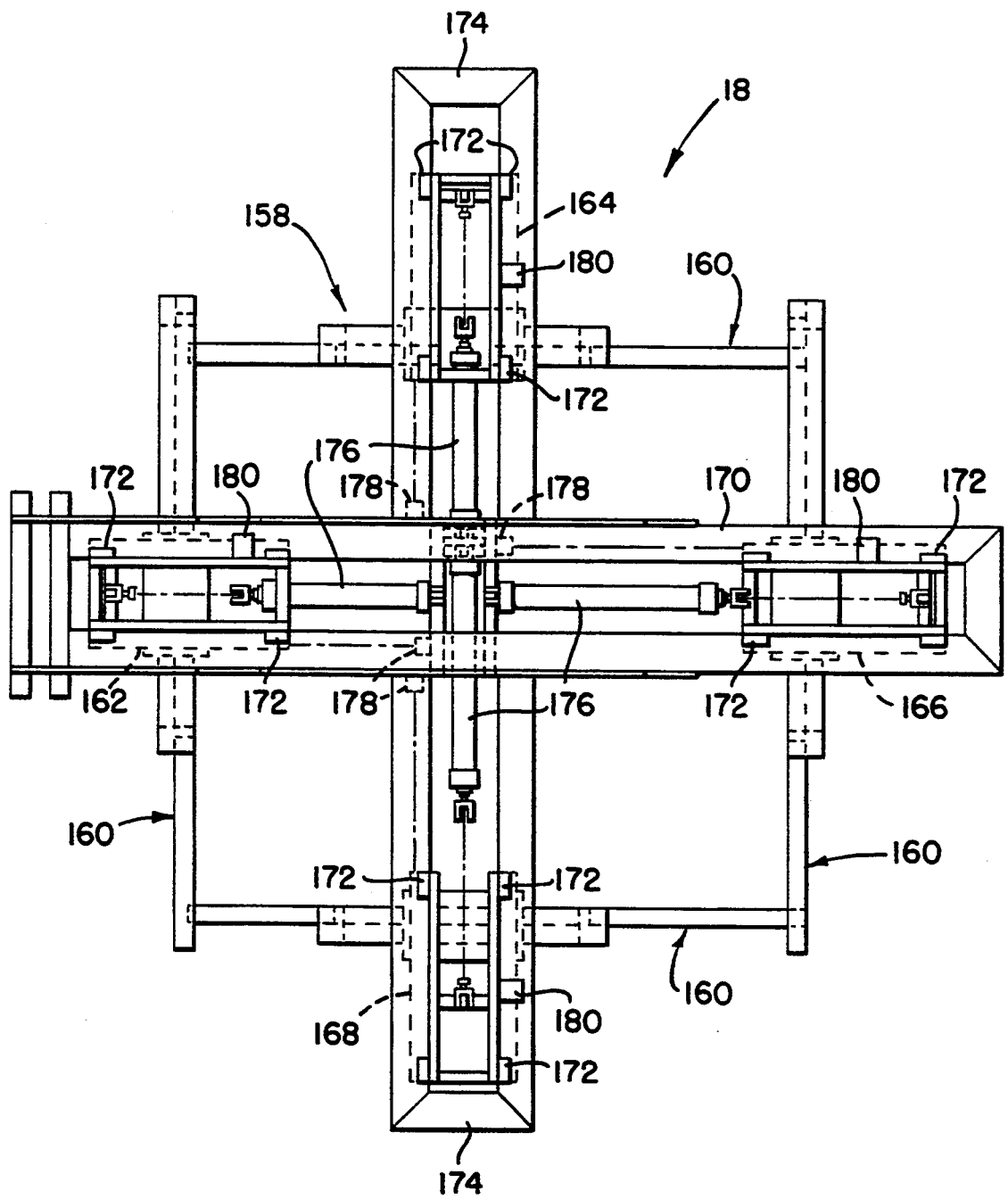

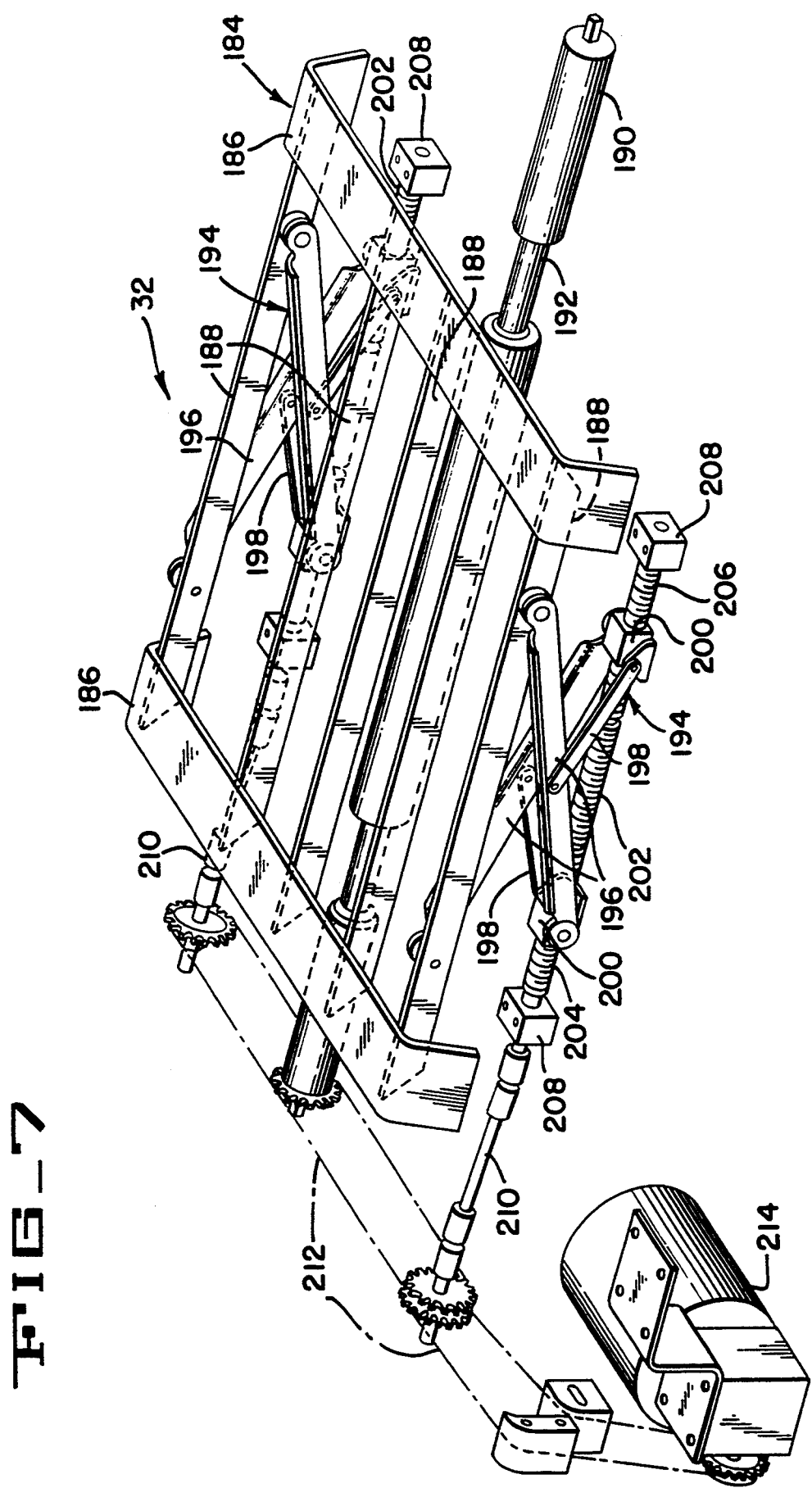
FIG_7

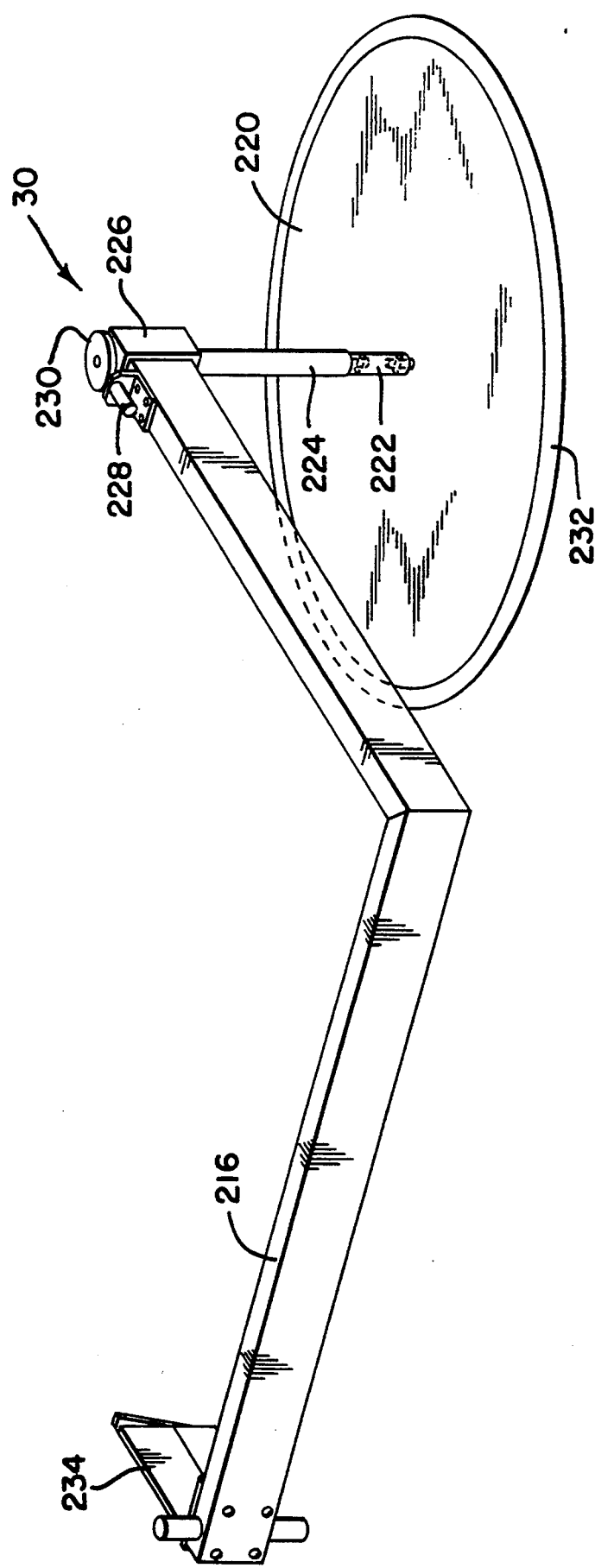

APPARATUS FOR PALLETIZING/UNITIZING EASILY COMPRESSIBLE PRODUCTS

BACKGROUND OF THE INVENTION

1. Field of the Invention

The present invention relates generally to apparatus for automatically stacking and unitizing articles. More particularly, the invention relates to such an apparatus which is specially adapted to both stack and unitize easily compressible articles, such as bundles of insulation.

2. Description of Related Art

Apparatus for automatically stacking and unitizing various articles are known in the art. Examples of such apparatus, generally referred to as robotic palletizers or unitizers, are disclosed in U.S. Pat. Nos. 4,995,224, 5,005,335 and 5,046,303, all commonly owned with the present application. These apparatus generally include a moveable hand assembly which picks the articles to be stacked off of an infeed conveyor and places them in a preselected orientation on a turntable. Once a single layer of articles is formed on the turntable, subsequent layers are formed on top of each other until a preselected stack height is reached. The apparatus may also include means for wrapping the articles on the turntable, either during the formation of individual layers or once the entire stack is formed, to thereby unitize the entire stack.

The stacking and unitizing of easily compressible products, such as bundles of insulation, poses special problems, however. Since they are dimensionally unstable, they are difficult to grip with conventional hand assemblies. In addition, since these articles are easily compressible, they are difficult to stack into multiple layers.

SUMMARY OF THE INVENTION

Therefore, it is an object of the present invention to provide an apparatus that can stack and unitize easily compressible articles.

According to the present invention, these and other objects and advantages are achieved by providing a unitizer which comprises a station conveyor having a diverter for selectively positioning the articles longitudinally along a path defined by the rollers of the station conveyor, a turner for selectively orienting the articles transverse to the path, a layer accumulation stop for blocking the travel of individual articles while the articles are combined into a single layer, a flusher for tightening up the articles in a layer, a hand assembly for picking up entire layers of articles while subsequent layers are positioned below the hand assembly and for transporting multiple layers to the turntable of a palletizer, a platen assembly for maintaining the integrity of the stacked articles while they are on the turntable, and a lift for raising the stack during wrapping so that the articles can be underwrapped.

These and other objects and advantages of the present invention will be made apparent from the following detailed description, with reference to the accompanying drawings.

BRIEF DESCRIPTION OF THE DRAWINGS

FIG. 1 is an isometric view of the present invention showing certain of the components in representative fashion to illustrate their relative locations, some of the components not being depicted for purposes of clarity;

FIG. 2A is an isometric view of the station conveyor component of the present invention;

FIG. 2B is a side elevation of the station conveyor depicted in FIG. 2A;

FIG. 3A is an isometric view of the diverter component of the present invention;

FIG. 3B is a top plan view of the diverter depicted in FIG. 3A;

FIG. 3C is an enlarged partial top plan view of the diverter depicted in FIG. 3B;

FIG. 4A is an isometric view of the layer accumulation stop component of the present invention;

FIG. 4B is a side elevation of the layer accumulation stop depicted in FIG. 4A;

FIG. 5 is an isometric view of the flusher component of the present invention;

FIG. 6A is an isometric view of the hand assembly component of the present invention;

FIG. 6B is a top plan view of the hand assembly depicted in FIG. 6A;

FIG. 7 is an isometric view of the lift component of the present invention; and

FIG. 8 is an isometric view of the platen component of the present invention.

DETAILED DESCRIPTION OF THE PREFERRED EMBODIMENTS

FIG. 1 is a general representation of the major components of the present invention, but does not include the hand assembly component, which will be described below, for purposes of clarity. The apparatus of the present invention, designated generally by reference number 10, is useful for palletizing or unitizing easily compressible articles, such as bundles of insulation. While palletizing generally refers to stacking a plurality of articles onto a pallet and unitizing generally refers to stacking articles on other than a pallet and wrapping the stacked articles with plastic or a similar material to create a unified load, for purposes of simplicity apparatus 10 will herein be referred to as a unitizer.

Referring to FIG. 1, unitizer 10 is shown to comprise a station conveyor 12 for transporting articles from a metering conveyor 14 to a Cartesian-style palletizer 16. With a few exceptions, which are noted below, palletizer 16 is as described in U.S. Pat. Nos. 4,995,224 and 5,005,335, which are under common ownership with the present application. Briefly, palletizer 16 comprises a horizontal support or Y-axis member 18, from which is suspended the hand assembly, which will be described later; a horizontal boom or X-axis member 20, on which Y-axis member 18 is supported for horizontal translational motion; a vertical mast or Z-axis member 22, on which X-axis member 20 is supported for vertical translational motion; a turntable 24, a film supply unit 26 and a discharge conveyor 28. In the preferred embodiment of the invention, unitizer 10 also includes a platen assembly 30 and a turntable lift 32, which are not described in the aforementioned patents.

Referring to FIGS. 2A and 2B, station conveyor 12 is shown to comprise a stationary frame 34 constructed of two side channel members 36 supported on a number of legs 38. Station conveyor 12 also includes a plurality of rollers 40, the ends of which are rotationally supported in side channel members 36. While only a few representative rollers 40 are shown in the Figures, a sufficient number are preferably employed so that adjacent rollers 40 are spaced only slightly apart along the length of station conveyor 12. In this manner, rollers 40 define a continuous rolling path from metering conveyor 14 to palletizer 16. Of course, other means may be used in place of rollers 40, such as one or more conveyor belts.

Station conveyor 12 further comprises a number of components to allow the individual articles to be formed into a layer in any one of several preselected patterns. To this end, station conveyor 12 includes an article diverter 42, preferably two article turners 44 (only one of which is shown in FIG. 2A), a retractable layer accumulation stop 46, a flusher assembly 48 and one or more retractable end stops 50 (only one of which is shown in FIGS. 2A and 2B), each of which will be described more fully below. These components define three stations along station conveyor 12: an article orientation station between metering conveyor 14 and just downstream of turners 44, a layer formation station between turners 44 and layer accumulation stop 46 and a stacking and pickup station between layer accumulation stop 46 and end stop 50.

In the article orientation station, the individual articles to be combined and unitized by unitizer 10 are received, one at a time, from metering conveyor 14 and transported on rollers 40 through diverter 42, which is automatically operable to direct each article to any of a number of predetermined longitudinal positions along the path defined by rollers 40. The articles then pass in the vicinity of turners 44, either one of which may be automatically activated to orient each article transversely to the path. The operation of diverter 42 and turners 44, as well as the other components of unitizer 10, is controlled by a programmable logic controller ("PLC"), or similar means, and is determined by a preselected pattern into which the individual articles will be combined to form one layer of a multi-layer unitized load. After passing turners 44, the articles of a single layer enter the layer formation station and engage layer accumulation stop 46, which blocks the passage of the individual articles until an entire layer is formed, at which point layer accumulation stop 46 retracts to allow the entire layer of articles to progress as a unit to the stacking and pickup station, where individual layers are combined with other layers into a single stack or load prior to the load being transported to turntable 24 of palletizer 16. In the stacking and pickup station, the individual layers engage one of the end stops 50. End stops 50 are preferably spaced approximately four inches apart at the end of station conveyor 12 opposite metering conveyor 14, and which one is raised depends upon the length of the layer, as determined by the pattern selected. Once the entire layer of articles reaches end stop 50, flusher 48 is activated to push the articles together to thereby tighten up the layer and prepare it for handling by the hand assembly of palletizer 16, as will be described.

In the preferred embodiment of the invention, the rollers of each station are powered by drives operating at different speeds. Referring to FIG. 2B, a first drive motor 52 and drive belt 54 operate in a known fashion to drive the rollers 40 of the article orientation station at a rate approximately three times greater than the rate of metering conveyor 14. This greater speed creates a space between each article and the subsequent article so that each article can be oriented separately by diverter 42 and turners 44 without interference from the subsequent article. A second drive motor 56 and drive belt 58 operate to drive the rollers of the layer formation station at a rate lesser than that of the rollers of the article orientation station. This lesser speed helps to decelerate the articles as they approach layer accumulation stop 46 to help prevent the articles from becoming disoriented, which could happen if the articles strike layer accumulation stop 46 too hard. A third drive motor 60 and drive belt 62 operate to drive the rollers of the stacking and pickup station at a rate lesser than that of the rollers of the layer formation station. This lesser speed keeps the articles firmly together as they are being conveyed from the layer formation station to the stacking and pickup station, since the articles at the rear of the layer will tend to be pushed into the articles at the front of the layer. In addition, as the layer moves into position against end stop 50, a photo eye, or similar means, detects the presence of the layer and shuts off motor 60 so that the rollers 40 of the stacking and pickup station will not continue to drive the articles into end stop 50, which may cause the layer to distort.

Also in the preferred embodiment of the invention, station conveyor 12 comprises a number of slip collars 64 (only a representative few of which are shown in FIGS. 2A and 2B) mounted on the rollers 40 of the layer formation station. Slip collars 64 have an inside diameter slightly greater than the outside diameter of rollers 40, are approximately one and one-half inches wide and are separated by spacer members of approximately the same width. In this fashion, alternate slip collars 64 and spacer members extend substantially the length of each roller 40 in the layer formation station. Since slip collars 64 are free wheeling on rollers 40, they will normally turn with rollers 40 to propel the articles down station conveyor 12. However, when the articles engage layer accumulation stop 46, slip collars 64 will slip on rollers 40 so that the articles will not be continually driven into layer accumulation stop 46, which may tend to disorient the articles. In addition, the edges of slip collars 64 engage the articles to also help maintain them in the proper orientation while the rest of the articles defining a layer are brought into position. When the layer has been formed and layer accumulation stop 46 drops to allow the layer to proceed down station conveyor 12, slip collars 64 slip slightly as the layer accelerates up to speed to avoid any abrupt speed changes that could topple the articles or disorient the layer.

Referring to FIGS. 3A, 3B and 3C, in addition to FIG. 2B, diverter 42 will now be described. Diverter 42 comprises an inverted generally U-shaped frame 66 which is bolted to side channel members 36 through mountings 68. Diverter 42 also includes two substantially flat diverter arms 70, the ends of which closest to metering conveyor 14 are pivotably mounted upon vertical shafts 72 connected to the horizontal upper run of frame 66. Diverter 42 preferably also includes two arm supports 74, each of which is pivotably connected at one end to the top of shaft 72 and at the other end to the end of the corresponding arm 70 opposite shaft 72. Diverter 42 also comprises two article guides 76, which are mounted to the frame of metering conveyor 14 on either side of the metering belt, and corresponding flexible straps 78, which are connected between guides 76 and arms 70. Guides 76 and straps 78 guide the articles from metering conveyor 14 to between arms 70. Arms 70 are spaced apart to form a channel only slightly greater than the width of the articles to prevent the articles from tipping over. A plurality of anti-friction bearings 80 mounted along the length of each arm 70 prevents the articles from getting stuck within the channel formed by arms 70. Spaced approximately twelve inches from each shaft 72 is a second vertical shaft 82 pivotably connected to each arm 70. The relative upper ends of shafts 82 are connected to a horizontal yoke 84, and a linkage 86 connects the upper end of one shaft 82 to a threaded hub member 88 (FIG. 3C). Hub member 88 engages a horizontal threaded screw drive 90 rotationally supported on frame 66. Activation of a brake motor 92 rotates screw 90, which in turn drives hub 88. Depending on the direction of travel, hub 88 pulls or pushes shaft 82 through linkage 86 to thereby swing arms 70 transversely across station conveyor 12. A rotary encoder 94 mounted to one end of screw 90 tracks the precise position of hub 88 and, therefore, arms 70. Motor 92 and encoder 94 thus provide for infinite, yet repeatable, positioning of arms 70 across station conveyor 12. In this manner, diverter 42 functions in response to the PLC to direct the individual articles being conveyed between arms 70 into any one of a number of preselected longitudinal positions along the path defined by rollers 40, the exact position depending on the particular pattern selected for the layer being formed.

Referring again to FIG. 2A, each turner 44 (only one of which is depicted for purposes of simplicity) comprises a base 96, which is mounted to a corresponding side channel member 36 through appropriate means; a pivot arm 98, one end of which is pivotably connected to base 96; an air cylinder 100, which is connected between a base extension member 102 and pivot arm 98; and a deflection plate 104, which is connected to the end of arm 98 opposite its connection to base 96. Air cylinder 100 is selectively operable by means of the PLC to swing arm 98 and, therefore, plate 104 into the path of an article being conveyed on rollers 40. As the leading corner of an article engages plate 104, it is stopped while rollers 40 continue to drive the trailing portion of the article around plate 104, thereby turning the article approximately ninety degrees before it disengages turner 44. Depending on the selected pattern for the layer being formed, either one of the turners 44 will be activated if an article being conveyed along the side of station conveyor 12 adjacent the turner is required to be oriented transversely to the path defined by rollers 40.

Referring to FIGS. 4A and 4B, layer accumulation stop 46 is shown in relation to a representative roller 40 to comprise a horizontal frame member 106 having end mounting portions 108 for mounting layer accumulation stop 46 to the undersides of side channel members 36; a vertical stationary plate 110 mounted to frame member 106 and extending substantially between side channel members 36; a vertical J-shaped channel member 112 connected to each end of stationary plate 110; a vertical stop plate 114 slidably received within the grooves of both channel members 112; and preferably two air cylinders 116, the cylinders of which are connected to stationary plate 110 and the pistons of which are connected to the stop plate by any appropriate means. Air cylinders 116 are selectively operable by means of the PLC to raise stop plate 114, when appropriate, to block the travel of the articles being formed into a single layer until the entire layer has been compiled.

Layer accumulation stop 46 also includes a spring operated dampener assembly, generally 118, to cushion the impact of the articles against stop plate 114. Dampener assembly 118 comprises preferably two generally S-shaped deceleration plates 120, each of which is connected to a pivot bar 122. The ends of pivot bars 122 are rotatably supported in pivot support blocks 124, which are mounted to stop plate 114 by any appropriate means. A spring 126 is connected between each deceleration plate 120 and stop plate 114, such as by hook bolts 128. Travel limiting bolts 130 connected to stop plate 114 engage the lower ends of deceleration plates 120 to prevent the upper ends of deceleration plates 120 from engaging rollers 40 when layer accumulation stop 46 is in the retracted position. When layer accumulation stop 46 is raised, an article being conveyed on rollers 40 will strike a deceleration plate 120, causing deceleration plate 120 to pivot about pivot bar 122 and the lower end to pull against spring 126, thereby cushioning the impact of the article against layer accumulation stop 46. Two deceleration plates 120 are preferably used so that once one article travelling along one side of station conveyor 12 has been stopped, a second article travelling along the other side can also be decelerated.

Referring to FIG. 5, flusher assembly 48 is shown to comprise three elongated, horizontal frame elements 132, the ends of which are mounted to the undersides of side channel members 36. Flusher assembly 48 also includes a vertical fixed frame plate 134, which is connected to one end of each outer frame element 132, and a vertical J-shaped channel member 136 mounted to each side of frame plate 134. A vertical plate 138 is slidably received within the grooves of channel members 136 and is retractable by means of preferably two air cylinders 140, the cylinders of which are connected to fixed frame plate 134 and the pistons of which are connected to plate 138. A horizontal support bar 142 is mounted to the top of plate 138. Flusher assembly 48 also comprises a shaft 144 mounted longitudinally along each outer frame element 132 and a sweep assembly, generally 146, moveably connected to shafts 144 by way of linear bearings 148. Sweep assembly 146 includes a horizontal bracket 150, to which linear bearings 148 are connected; an arcuate leg 152 connected to each end of bracket 150; and a pusher bar 154 mounted to the tops of legs 152. Sweep assembly 146 is driven along shafts 144 by means of a conventional cable cylinder assembly 156, which is connected between bracket 150 and the middle frame element 132. When the layer from the layer formation station reaches an end stop 50, cable cylinder assembly 156 is activated by the PLC to pull sweep assembly 146 towards the layer, thereby slightly compressing the sides of the layer between pusher bar 154 and support bar 142 to eliminate any gaps between the articles in the layer and generally tighten up the layer in preparation for handling by the hand assembly of palletizer 16. Once this operation has been completed, the PLC will activate both cable cylinder assembly 156 to retract sweep assembly 146 and air cylinders 140 to retract plate 138 to thereby move pusher bar 154 and support bar 142 out of the way of the hand assembly.

Each end stop 50 is identical to the layer accumulation stop 46 described above, the only exception being that end stops 50 preferably do not include spring operated dampener assembly 118 of layer accumulation stop 46. Since the rollers 40 of the stacking and pickup station operate at a rate lesser than the rollers of the layer formation station and stop once the layer reaches the vicinity of end stop 50, a dampener assembly is not required. As mentioned above, a number of end stops 50, preferably three, are incorporated into station conveyor 12. Depending on the length of the layer being formed, a particular end stop 50 will be activated by the PLC to position the layer evenly under the hand assembly. As the hand assembly reaches for the layer, the PLC will retract end stop 50 so that it will not interfere with the hand assembly.

The hand assembly component of unitizer 10 is specially designed to grip and transport the layers of easily compressible articles. Referring to FIGS. 6A and 6B, the hand assembly of the preferred embodiment, designated generally by reference number 158, comprises four palms 160, each of which is suspended from one of four respective carriage members 162, 164, 166 and 168. Carriage members 162 and 166 are mounted for movement along the longitudinal rails 170 of Y-axis member 18 by means of cam rollers 172 engaging the tops and bottoms of rails 170. Similarly, carriage members 164 and 168 are mounted for movement along the transverse rails 174 of Y-axis member 18. Hand assembly 158 includes a long stroke air cylinder 176 connected between the central portion of Y-axis member 18 and each carriage member 162 through 168. Each air cylinder 176 is selectively operable by the PLC to drive the corresponding carriage member back and forth along rails 170 or 174 to thereby open and close palms 160. Hand assembly 158 also preferably includes an encoder 178, such as a linear encoder, connected between each carriage member 162 through 168 and the Y-axis member to enable the PLC to control the precise positioning of the carriage members and, therefore, palms 160. In addition, the preferred hand assembly 158 includes an air actuated brake 180 connected to each carriage assembly 162 through 168. Each brake 180 comprises a small air cylinder and a rubber pad affixed to the end of the piston. Activation of brake 180 extends the rubber pad against rails 170 or 174 and thereby prevents the carriage member from moving. Brakes 180 are engaged whenever the air cylinder 176 for the corresponding carriage is not activated. This minimizes drift of the carriage member and therefore improves repeatability of the positioning of the carriage member.

The travel of carriages 162 through 168 is controlled by the PLC and depends upon the preselected pattern for the layers being formed on station conveyor 12. In addition, the activation of the air cylinders 176 connected to the carriage members may not be simultaneous. For example, the PLC may be programmed to retract carriages 164 and 166 a certain minimum distance, as determined by the desired pattern of the articles in a layer. Once carriages 164 and 166 reach their positions, the PLC may then first retract carriage 168 and then carriage 162 past certain minimum distances until the corresponding air cylinders 176 stall out, thus ensuring a tight grip on the articles.

Palms 160 are preferably constructed of a series of horizontal bars connected to two vertical tubes. As illustrated in FIG. 6A, the horizontal bars extend beyond the vertical tubes on at least some of palms 160. This allows the palms to interlace around the articles to ensure that the integrity of the layers are maintained as they are being lifted by hand assembly 158. In addition, the outer edges of the articles of a layer intrude slightly into the spaces between the horizontal bars. This helps prevent the articles from slipping out from between palms 160. The palm nearest turntable 24 also comprises a vertical opening 182 in the horizontal bars, the purpose of which will be described below. While four palms 160 are preferred to enable hand assembly 158 to contact and totally envelope the layers on all four sides, other numbers and configurations of palms could be used, for example, two palms having a right-angle configuration.

The process of unitizing a load is carried out by palletizer 16 and hand assembly 158 on the stacking and pickup station of station conveyor 12. When a first layer of articles is in position against final stop 50, palletizer 16 will lower hand assembly 158 down around the layer and palms 160 will close to a predetermined position, as described above, to allow a certain amount of squeeze of the product. Palletizer 16 will then raise hand assembly 158, lifting the first layer high enough to let a second layer move into position against end stop 50. Palms 160 will then open slightly, allowing the first layer to drop onto the second layer, and palletizer 16 will lower hand assembly 158 until palms 160 are positioned around both the first and second layers. Palms 160 will then close around both the first and second layers, and the process will be repeated depending upon the number of layers that has been selected to constitute a single stack or load of articles. Once the entire load has been formed, palletizer 16 will transport the load within hand assembly 158 to turntable 24. The operation of palletizer 16 to raise and lower hand assembly 158 and transport hand assembly 158 between the stacking and pickup station and turntable 24 is described in the aforementioned commonly owned U.S. patents, but a full description thereof is not necessary to an understanding of the present invention.

Once the load is placed on turntable 24, it will be wrapped with a film of material, such as prestreched plastic, to create a unified load of articles. The wrapping operation is described in detail in the previously mentioned commonly owned U.S. patents, but a full description thereof is not necessary to an understanding of the invention. However, the unitizer of the present invention preferably includes a lift 32 to aid in wrapping the load of articles. Referring to FIG. 7, lift 32 comprises a horizontal lift platform 184 having substantially flat end members 186 and several cross members 188 connected between end members 186. Platform 184 is positioned over the rollers 190 (only one of which is depicted in FIG. 7 for purposes of simplicity and clarity) of turntable 24. Rollers 190 are formed with reduced diameter portions 192 to allow end members 186 to recede below the upper surfaces of rollers 190 when lift 32 is in the lowered position. Lift 32 also includes two scissor assemblies 194, each comprising two main links 196 and two secondary links 198. The ends of each main link 196 are pivotably connected between the end cross members 188 and a threaded block 200. The ends of each secondary link 198 are pivotably connected between threaded block 200 and the main link 196 which is not connected to that threaded block 200. In this manner, secondary links 198 tend to stabilize platform 184 as it is being raised and lowered. Threaded blocks 200 engage a threaded screw 202 which includes a left hand threaded portion 204 and a right hand threaded portion 206. The ends of screw 202 are rotationally mounted in bearing blocks 208, which are mounted to the frame of turntable 24 by any suitable means. Screw 202 is driven through a linkage 210 and a chain drive 212 by a motor 214. Motor 214 is selectively activated by the PLC to turn screw 202 and thereby raise or lower scissor assembly 194 and, therefore, platform 184. Typically, lift 32 will remain lowered until the wrap has proceeded from the bottom of the load of articles to the top. Then, as the wrap proceeds down again, lift 32 will raise the load so that the load can be underwrapped slightly to prevent the articles from falling out the bottom of the unified load.

Referring to FIGS. 1 and 8, unitizer 10 also preferably comprises a platen assembly 30 to stabilize the load of articles on turntable 24 after it has been released by hand assembly 158. Platen assembly 30 includes a platen arm 216 pivotably connected to a carriage member mounted for movement in an elevator device 218, which is similar to the film dispenser elevator found in prior art devices. Platen assembly 30 also includes a generally circular platen 220 connected by means of a U-joint 222 to a vertical shaft 224, which is both rotationally and translationally mounted in a support bushing 226 connected to the end of arm 216 opposite elevator 218. In operation, platen 220 is lowered onto the top of the load of articles positioned on turntable 24. When platen 230 engages the top of the load, it will continue to lower until a proximity switch 228 at the end of arm 216 senses a disk 230 mounted to the top of shaft 224 and signals that the PLC should shut off the motor for elevator 218. The U-joint 222 allows platen 220 to freely tilt to accommodate uneven articles and the shaft 224 in bushing 226 allows platen 220 to rotate as turntable 24 rotates during wrapping of the load. An arcuate tube 232 connected to the periphery of platen 220 extends slightly below platen 220 and aids in maintaining the articles positioned in the load. A bracket 234 connected to the end of arm 216 adjacent elevator 218 maintains arm 216 in the proper position. A magnet (not shown) mounted on the elevator carriage member keeps bracket 234 in the proper position but allows arm 216 to swing out of the way in the event it inadvertently knocks into another part of unitizer 10.

Opening 182 in the palm 160 of hand assembly 158 closest to turntable 24 allows platen assembly 30 to position platen 220 over the load while the load is still in hand assembly 158, thus allowing the integrity of the load to be maintained at all times. As hand assembly 158 is raised, arm 216 will slip between opening 182 and not interfere with hand assembly 158.

As mentioned above, the entire unitizer 10 is controlled by the PLC. Inputs for sensing locations of the articles throughout the system and determining completed operations are generated by photo cells and limit switches, while the positions of the various elements of unitizer 10 are generally determined by encoders.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. An apparatus for automatically stacking individual articles of an easily compressible product which comprises:
   (a) a palletizer having a turntable, a Y-axis member for supporting a hand assembly and means for transporting the hand assembly between a first position adjacent the palletizer and a second position adjacent the turntable;
   (b) a station conveyor for transporting the articles from a production line to the first position adjacent the palletizer, the station conveyor including
   a plurality of rollers defining a path for the articles;
   diverter means for selectively directing each article to one of a plurality of longitudinal positions along the path;
   turner means for selectively orienting each article transversely to the path;
   layer accumulation stop means for holding each article in position along the path while the articles are combined into a single layer having a preselected orientation; and
   means for maintaining the articles in the preselected orientation while the layer is formed;
   (c) the hand assembly including
   a plurality of palms of sufficient size to grasp at least two layers of articles, the layers of articles defining a stack of articles;
   carriage means for movably connecting each palm to the Y-axis member; and
   means for selectively moving the carriage means to thereby open and close the palms;
   (d) platen means for maintaining the integrity of the stack of articles on the turntable after the stack has been transported by the means for transporting to the turntable and released by the hand assembly; and
   said means for maintaining the articles in the preselected orientation including a plurality of slip rings mounted on the rollers immediately upstream of the layer accumulation stop means and a plurality of spacer members, one located between successive slip rings on each roller, to maintain a desired spacing between the slip rings.

2. The apparatus of claim 1, wherein the station conveyor further comprises flusher means located downstream of the layer accumulation stop means for pushing the articles of a layer together in a direction transverse to the path.

3. The apparatus of claim 2, wherein the flusher means comprises a frame member, a vertical plate positioned at one side of the path and slideably connected to the frame member, a sweep assembly positioned at the side of the path opposite the vertical plate and slideably connected to the frame member, means for selectively raising and lowering the vertical plate, and means for selectively sliding the sweep assembly toward and away from the vertical plate.

4. The apparatus of claim 1, further comprising lift means for elevating the stack of articles above the turntable.

5. The apparatus of claim 1, wherein the rollers define at least two different stations along the path and the apparatus comprises means for driving the rollers of each station at different rates.

6. The apparatus of claim 5, wherein the rollers define three stations: an article orientation station located between an upstream end of the station conveyor and a position immediately downstream of the turner means, a layer formation station located between the turner means and the layer accumulation stop means, and a stacking and pickup station located between the layer accumulation stop means and a downstream end of the station conveyor.

7. The apparatus of claim 6, wherein the means for driving the rollers at different rates comprises a first motor, a second motor and a third motor.

8. The apparatus of claim 7, wherein the first motor drives the rollers of the article orientation station at a first rate, the second motor drives the rollers of the layer formation station at a second rate which is less than the first rate, and the third motor drives the rollers of the stacking and pickup station at a third rate which is less than the second rate.

9. The apparatus of claim 8, further comprising means associated with the third motor for detecting the presence of articles and de-energizing the third motor when the articles reach the downstream end of the station conveyor.

10. The apparatus of claim 9, wherein the means for detecting comprises a photo detector.

11. The apparatus of claim 1, wherein the hand assembly further comprises an encoder means associated with each carriage means for tracking the position of each palm.

12. The apparatus of claim 11, wherein the means for selectively moving the carriage means comprises an air cylinder connected between each carriage means and the Y-axis member.

13. The apparatus of claim 12, wherein the hand assembly comprises brake means associated with each carriage means for preventing movement of the carriage means when the air cylinder is not activated to move the carriage means.

14. The apparatus of claim 1, wherein the diverter means comprises a frame, two parallel arms pivotably supported on the frame and defining a channel for the articles, and means connected between the frame and the arms for driving the arms across the path to selectively align the channel with one of a plurality of longitudinal positions along the path.

15. The apparatus of claim 14, wherein the diverter means further comprises encoder means for tracking the position of the channel across the path.

16. The apparatus of claim 15, wherein the means for driving comprises a brake motor.

17. The apparatus of claim 14, wherein the diverter means further comprises a plurality of anti-friction bearings mounted on the sides of the arms defining the channel.

18. An apparatus for automatically stacking individual articles of an easily compressible product which comprises:
(a) a palletizer having a turntable, a Y-axis member for supporting a hand assembly and means for transporting the hand assembly between a first position adjacent the palletizer and a second position adjacent the turntable;
(b) a station conveyor for transporting the articles from a production line to the first position adjacent the palletizer, the station conveyor including
a plurality of rollers defining a path for the articles;
diverter means for selectively directing each article to one of a plurality of longitudinal positions along the path;
turner means for selectively orienting each article transversely to the path;
layer accumulation stop means for holding each article in position along the path while the articles are combined into a single layer having a preselected orientation; and
means for maintaining the articles in the preselected orientation while the layer is formed;
(c) the hand assembly including
a plurality of palms of sufficient size to grasp at least two layers of articles, the layers of articles defining a stack of articles;
carriage means for movably connecting each palm to the Y-axis member; and
means for selectively moving the carriage means to thereby open and close the palms;
(d) platen means for maintaining the integrity of the stack of articles on the turntable after the stack has been transported by the means for transporting to the turntable and released by the hand assembly;
wherein the layer accumulation stop means includes a frame, a stop plate slideably connected to the frame, means for selectively raising and lowering the stop plate, and a dampener means connected to the stop plate for cushioning the impact of the articles against the stop plate; and wherein the dampener means includes at least one deceleration plate pivotably connected to the stop plate and a spring extending between the deceleration plate and the stop plate.

19. The apparatus of claim 18, wherein the means for selectively raising and lowering the stop plate comprises at least one air cylinder.

20. The apparatus of claim 18, wherein the station conveyor comprises at least one end stop means located near the downstream end of the station conveyor for halting the progression of the layer of articles along the path.

21. The apparatus of claim 20, wherein the end stop means comprises a frame, a stop plate slideably connected to the frame and means for selectively raising and lowering the stop plate.

22. The apparatus of claim 21, wherein the means for selectively raising and lowering the stop plate comprises at least one air cylinder.

23. The apparatus of claim 20, wherein the station conveyor comprises at least two end stop means and the apparatus comprises means for selectively activating either one of the end stop means.

24. An apparatus for automatically stacking individual articles of an easily compressible product which comprises:
(a) a palletizer having a turntable, a Y-axis member for supporting a hand assembly and means for transporting the hand assembly between a first position adjacent the palletizer and a second position adjacent the turntable;
(b) a station conveyor for transporting the articles from a production line to the first position adjacent the palletizer, the station conveyor including
a plurality of rollers defining a path for the articles;
diverter means for selectively directing each article to one of a plurality of longitudinal positions along the path;
turner means for selectively orienting each article transversely to the path;
layer accumulation stop means for holding each article in position along the path while the articles are combined into a single layer having a preselected orientation; and
means for maintaining the articles in the preselected orientation while the layer is formed;
(c) the hand assembly including
a plurality of palms of sufficient size to grasp at least two layers of articles, the layers of articles defining a stack of articles;
carriage means for movably connecting each palm to the Y-axis member; and
means for selectively moving the carriage means to thereby open and close the palms;

(d) platen means for maintaining the integrity of the stack of articles on the turntable after the stack has been transported by the means for transporting to the turntable and released by the hand assembly; and wherein each palm comprises a plurality of spaced apart, horizontal tubes defining openings into which a portion of the articles may slightly extend when the palms are closed to thereby prevent the articles from slipping out of the hand assembly.

25. The apparatus of claim 24, wherein one of the palms comprises an opening into which the platen means may extend when the hand assembly is positioned at the turntable.

26. An apparatus for automatically stacking individual articles of an easily compressible product which comprises:

(a) a palletizer having a turntable, a Y-axis member for supporting a hand assembly and means for transporting the hand assembly between a first position adjacent the palletizer and a second position adjacent the turntable;

(b) a station conveyor for transporting the articles from a production line to the first position adjacent the palletizer, the station conveyor including
a plurality of rollers defining a path for the articles;
diverter means for selectively directing each article to one of a plurality of longitudinal positions along the path;
turner means for selectively orienting each article transversely to the path;
layer accumulation stop means for holding each article in position along the path while the articles are combined into a single layer having a preselected orientation; and
means for maintaining the articles in the preselected orientation while the layer is formed;

(c) the hand assembly including
a plurality of palms of sufficient size to grasp at least two layers of articles, the layers of articles defining a stack of articles;
carriage means for movably connecting each palm to the Y-axis member; and
means for selectively moving the carriage means to thereby open and close the palms;

(d) platen means for maintaining the integrity of the stack of articles on the turntable after the stack has been transported by the means for transporting to the turntable and released by the hand assembly; and wherein the platen means includes a platen arm, means for raising and lowering the platen arm, and a platen which is both rotationally and translationally supported on the platen arm, and wherein the platen arm is pivotably connected to the means for raising and lowering the platen arm.

27. An apparatus for automatically stacking individual articles of an easily compressible product which comprises:

(a) a palletizer having a turntable, a Y-axis member for supporting a hand assembly and means for transporting the hand assembly between a first position adjacent the palletizer and a second position adjacent the turntable;

(b) a station conveyor for transporting the articles from a production line to the first position adjacent the palletizer, the station conveyor including
a plurality of rollers defining a path for the articles;
diverter means for selectively directing each article to one of a plurality of longitudinal positions along the path;
turner means for selectively orienting each article transversely to the path;
layer accumulation stop means for holding each article in position along the path while the articles are combined into a single layer having a preselected orientation and
means for maintaining the articles in the preselected orientation while the layer is formed;

(c) the hand assembly including
a plurality of palms of sufficient size to grasp at least two layers of articles, the layers of articles defining a stack of articles;
carriage means for movably connecting each palm to the Y-axis member; and
means for selectively moving the carriage means to thereby open and close the palms;

(d) platen means for maintaining the integrity of the stack of articles on the turntable after the stack has been transported by the means for transporting to the turntable and released by the hand assembly; and (e) lift means for elevating the stack of articles above the turntable;

(f) wherein the lift means comprises a horizontal platform supported upon at least one scissor assembly, the scissor assembly comprising two crossed links which are connected at their upper ends to the platform and at their lower ends to separate threaded blocks that engage a threaded screw having a right hand threaded portion and a left hand threaded portion, the screw being selectively rotated by a motor to thereby raise and lower the platform.

28. The apparatus of claim 27, wherein the turntable comprises a plurality of turntable rollers, at least some of which comprise reduced diameter portions to allow the platform to recede below an upper surface defined by the turntable rollers.

* * * * *